United States Patent
Zhiyanov et al.

(10) Patent No.: US 10,248,732 B2
(45) Date of Patent: Apr. 2, 2019

(54) IDENTIFYING RELATED ENTITIES

(71) Applicant: Microsoft Technology Licensing, LLC, Redmond, WA (US)

(72) Inventors: Dmitry Zhiyanov, Bothell, WA (US); Deqing Chen, Issaquah, WA (US); Yan Ke, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/922,274

(22) Filed: Oct. 26, 2015

(65) Prior Publication Data

US 2016/0147780 A1 May 26, 2016

Related U.S. Application Data

(63) Continuation of application No. 13/355,697, filed on Jan. 23, 2012, now Pat. No. 9,201,964.

(51) Int. Cl.
*G06F 17/30* (2006.01)

(52) U.S. Cl.
CPC .... *G06F 17/3087* (2013.01); *G06F 17/30256* (2013.01); *G06F 17/30539* (2013.01); *G06F 17/30554* (2013.01); *G06F 17/30864* (2013.01)

(58) Field of Classification Search
CPC ......... G06F 17/30598; G06F 17/30864; G06F 17/30389; G06F 17/2247; G06F 17/30286; G06F 17/30672; G06F 17/30867; G06F 17/30893
USPC ........................................ 707/716, 723, 770
See application file for complete search history.

(56) References Cited

U.S. PATENT DOCUMENTS

| | | | |
|---|---|---|---|
| 5,594,898 A | 1/1997 | Dalal et al. |
| 5,615,112 A | 3/1997 | Liu Sheng et al. |
| 5,991,776 A | 11/1999 | Bennett et al. |
| 6,108,660 A | 8/2000 | Ikeda et al. |
| 6,523,036 B1 | 2/2003 | Hickman et al. |
| 6,629,097 B1 | 9/2003 | Keith |
| 6,763,349 B1 | 7/2004 | Sacco |

(Continued)

FOREIGN PATENT DOCUMENTS

WO   2007113546 A1   10/2007

OTHER PUBLICATIONS

Baeza-Yates, et al. Generalizing Pagerank: Damping Functions of Rlink-Based Ranking Algorithms. In Proceedsing of the 29th Annual International ACM SIGIR Conference on Research and Development in Information Retrieval, Aug. 6-10, 2006, p. 308-315.

(Continued)

*Primary Examiner* — Shahid A Alam
(74) *Attorney, Agent, or Firm* — Shook, Hardy & Bacon, L.L.P.

(57) ABSTRACT

Methods, systems, and computer-storage media having computer-usable instructions embodied thereon for identifying related entities are provided. One or more entities may be identified from a search query. The one or more entities may include any identifiable term having related information associated therewith. An entity store may be referenced to identify one or more related entities related to the entity. The one or more related entities, along with their relationship(s) to the entity (and one another, perhaps) may then be ranked and displayed to a user.

9 Claims, 6 Drawing Sheets

(56) References Cited

U.S. PATENT DOCUMENTS

| | | | |
|---|---|---|---|
| 6,807,306 B1* | 10/2004 | Girgensohn | G06F 17/30802 |
| | | | 348/701 |
| 7,080,073 B1* | 7/2006 | Jiang | G06F 17/2229 |
| | | | 707/752 |
| 7,401,057 B2 | 7/2008 | Eder | |
| 7,433,826 B2 | 10/2008 | Korosec | |
| 7,480,373 B2 | 1/2009 | Glebocki | |
| 7,565,367 B2 | 7/2009 | Barrett et al. | |
| 7,634,474 B2 | 12/2009 | Vassilvitskii et al. | |
| 7,636,713 B2 | 12/2009 | Jadhav | |
| 7,730,085 B2 | 6/2010 | Hassan et al. | |
| 7,849,104 B2 | 12/2010 | Sun et al. | |
| 7,962,458 B2 | 6/2011 | Holenstein et al. | |
| 7,991,778 B2 | 8/2011 | Hull et al. | |
| 8,005,842 B1 | 8/2011 | Pasca et al. | |
| 8,050,999 B2 | 11/2011 | Peckholdt et al. | |
| 8,086,619 B2* | 12/2011 | Haahr | G06F 17/30648 |
| | | | 707/765 |
| 8,166,026 B1* | 4/2012 | Sadler | G06F 17/30864 |
| | | | 707/725 |
| 8,301,642 B2* | 10/2012 | Kommers | G06F 17/3097 |
| | | | 707/738 |
| 8,346,770 B2 | 1/2013 | Smith et al. | |
| 8,380,723 B2 | 2/2013 | Radlinski et al. | |
| 8,655,646 B2 | 2/2014 | Lee et al. | |
| 2004/0117358 A1 | 6/2004 | von Kaenel et al. | |
| 2006/0085417 A1 | 4/2006 | John et al. | |
| 2006/0242138 A1 | 10/2006 | Brill et al. | |
| 2007/0038600 A1 | 2/2007 | Guha | |
| 2007/0233671 A1 | 10/2007 | Oztekin et al. | |
| 2007/0244739 A1 | 10/2007 | Soito et al. | |
| 2008/0086264 A1 | 4/2008 | Fisher | |
| 2008/0140619 A1 | 6/2008 | Srivastava et al. | |
| 2008/0208847 A1 | 8/2008 | Moerchen et al. | |
| 2008/0275785 A1 | 11/2008 | Altberg et al. | |
| 2008/0275786 A1 | 11/2008 | Altberg et al. | |
| 2008/0306908 A1 | 12/2008 | Agrawal et al. | |
| 2008/0313119 A1 | 12/2008 | Leskovec et al. | |
| 2009/0089687 A1 | 4/2009 | Lecomte et al. | |
| 2009/0119281 A1 | 5/2009 | Wang et al. | |
| 2009/0172035 A1* | 7/2009 | Lessing | G06F 17/30595 |
| | | | 707/807 |
| 2010/0223252 A1 | 9/2010 | Broman et al. | |
| 2010/0250598 A1 | 9/2010 | Brauer et al. | |
| 2011/0022605 A1 | 1/2011 | Acharya et al. | |
| 2011/0184806 A1 | 7/2011 | Chen et al. | |
| 2011/0271232 A1 | 11/2011 | Crochet et al. | |
| 2011/0302149 A1 | 12/2011 | Vadlamani et al. | |
| 2012/0095996 A1 | 4/2012 | Dumant et al. | |
| 2013/0086057 A1 | 4/2013 | Harrington et al. | |

OTHER PUBLICATIONS

Billerbeck, et al., "Ranking Entities Using Web Search Query Logs", in Proceedings of European Conference on Research and Advanced Technology for Digital Libraries, Sep. 6-10, 2010, pp. 273-281.

Gomes et al. Modeling Information Persistence on the Web. In Proceedings of 6th International Conference on Web Engineering, Jul. 11-14, 2006, pp. 193-200.

Kang et al., "Ranking Related Entities for Web Search Queries", in Proceedings of 20th International Conference Companion on World Wide Web, Mar. 28-Apr. 1, 2011, pp. 67-68.

Metzler et al., Improving Search Relevance for Implicity Temporal Queries, in Proceedings of 32nd Annual International ACM SIGIR Conference on Research and Development in Information Retrieval, Jul. 19-23, 2009, pp. 100-701.

2454N. Tejaswi, Web Search Results Ranking: Pagerank Hits and Related Work, Published on Nov. 30, 2004, Available at http//www.it.iitb.ac.in/.about.Tejaswi/Seminar/Seminar.pdf.

Zhu, et al., "StatSnowball: a Statistical Approach to Extracting Entity Relationships", in Proceedings of 18th International Conference on World Wide Web, Apr. 20-24, 2009, pp. 101-110.

Zhang, et al., "Advertising Keywords Recommendation for Short-text Web Pages", in Proceedings of ACM Transactions on Intelligent Systems and Technology, vol. 1, No. 1, Article 1, Jan. 2011, 25 pages.

Alipanah, et al., "Ranking Ontologies Using Verified Entities to Facilitate Federated Queries", In ACM International Conference on Web Intelligence and Intelligent Agent Technology, 2010, 6 Pages.

Liu, et al., "Exploiting Entity Relationship for Query Expansion in Enterprise Search", In Extension of Entity Centric Query Expansion for Enterprise Search, Mar. 15, 2016, 34 Pages.

"Final Office Action Issued in U.S. Appl. No. 13/355,697", dated Apr. 1, 2015, 13 Pages.

"Non Final Office Action Issued in U.S. Appl. No. 13/355,697", dated Sep. 12, 2014, 9 Pages.

"Notice of Allowance Issued in U.S. Appl. No. 13/355,697", dated Jul. 31, 2015, 8 Pages.

"International Search Report and Written Opinion Issued in PCT Application No. PCT/US2013/022004", dated Apr. 30, 2013, 9 Pages.

Zaragoza, et al., "Ranking Very Many Typed Entities on Wikipedia", In Proceedings of the Sixteenth ACM Conference on Information and Knowledge Management, Nov. 6, 2007, pp. 1015-1018.

Ioannou, et al., "Enabling Entity-Based Aggregators for Web 2.0 data", In Proceedings of the 19th International Conference on World Wide Web, Apr. 26, 2010, pp. 1119-1120.

* cited by examiner

IDENTIFYING RELATED ENTITIES

CROSS-REFERENCE TO RELATED APPLICATIONS

This application is a continuation of U.S. application Ser. No. 13/355,697, filed Jan. 23, 2012, entitled "Identifying Related Entities," which is incorporated herein by reference in its entirety.

BACKGROUND

Users oftentimes enter a search query that may or may not yield relevant search results. For example, a user searching for a particular product of a manufacturer may enter a search query including the manufacturer's name. The search results, in this instance, are likely going to be directed to information related to the manufacturer, which is not relevant to the product for which the user is searching.

Search engine results pages (SERP) are typically presented to aid a user in finding desired information and include the search results and additional information to aid a user. For instance, the additional information may include an address for the manufacturer. The additional information, however, has no authority and is simply related to the SERP.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer storage media for, among other things, identifying related entities of a search query. One or more entities may be identified from an input search query. The one or more entities may include a person, a product, a company, a location, a combination thereof, or the like. Once the one or more entities are identified from the search query, an entity store may be referenced to identify one or more related entities. The entity store includes a collection of known entities (e.g., entities that have been previously identified and stored in the entity store) and their relationships to other entities. The one or more related entities, along with their relationship(s) to the entity (and one another, perhaps) may then be displayed in the SERP to the user.

In additional embodiments, the one or more related entities may be ranked to identify related entities having stronger relationships with the entity. Additionally, entity graphs may be created and stored in the entity store to clearly depict the related entities and the relationship to the entity (i.e., the originally input entity from the search query).

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
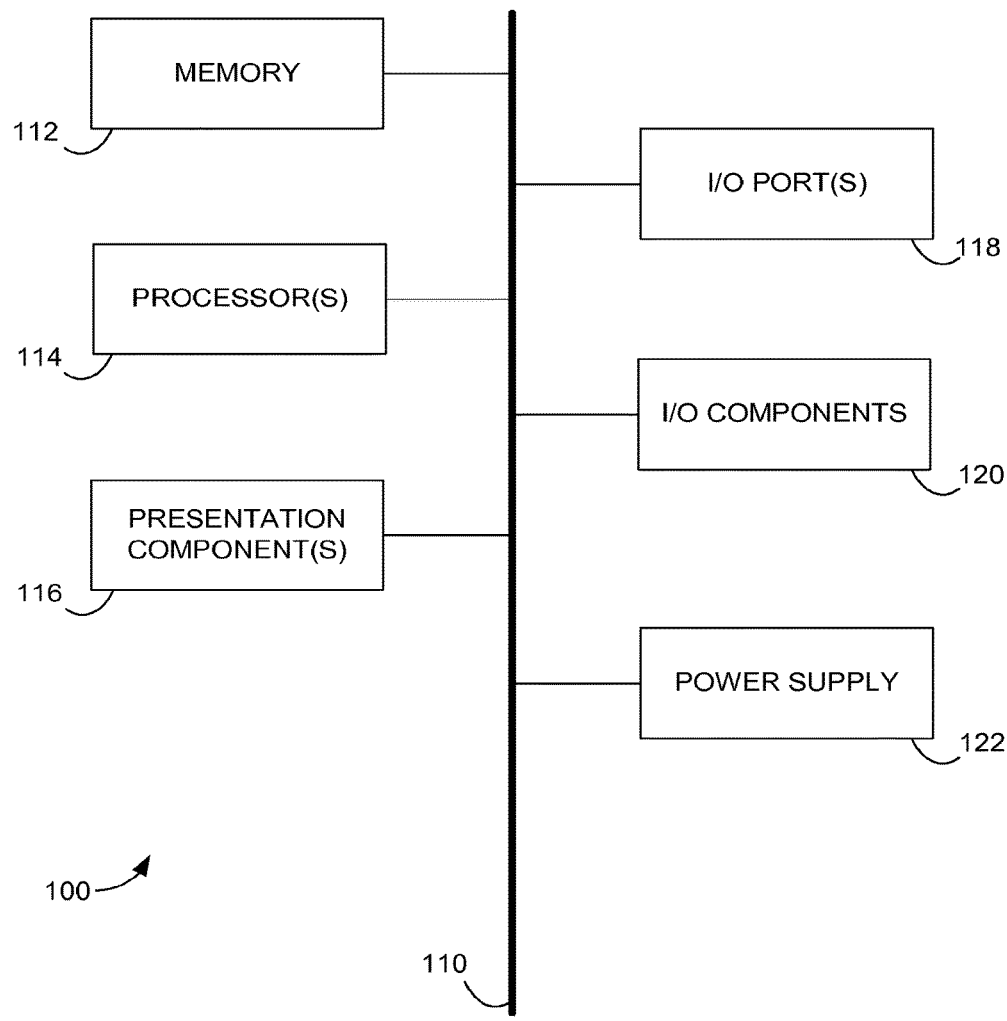
FIG. 1 is a block diagram of an exemplary computing system environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable media for, among other things, identifying related entities of a search query. One or more entities may be identified from an input search query. The one or more entities may include a person, a thing, a place, a product, a company, a location, a combination thereof, or the like. Entities may be anything in a search query that may be related to any other information. Once the one or more entities are identified from the search query, an entity store may be referenced to identify one or more related entities. The entity store includes a collection of known entities (e.g., entities that have been previously identified and stored in the entity store) and their relationships to other entities. The one or more related entities, along with their relationship(s) to the entity (and one another, perhaps) may then be displayed in the SERP to the user. In additional embodiments, the one or more related entities may be ranked to identify related entities having stronger relationships with the entity. Additionally, entity graphs may be created and stored in the entity store to clearly depict the related entities and the relationship to the entity (i.e., the originally input entity from the search query).

Accordingly, one embodiment of the present invention is directed to one or more computer storage media storing computer-useable instructions that, when used by one or more computing devices, cause the one or more computing devices to perform a method for identifying related entities. An entity may be identified from within a search query and an entity store is referenced to identify one or more related entities related to the entity identified in the search query. The one or more related entities may be identified as related in an entity graph. Alternatively, any indicator may be used to organize a data store to identify the one or more related entities. The data may be mined to identify a distance associated with each of the one or more related entities. A distance is a number of connections away from the entity within an entity graph. At least of the one or more related entities is displayed to a user. In embodiments, the displayed related entity may have a predetermined distance from the original entity.

Another embodiment of the present invention is directed to a system for identifying related entities. The system comprises a computing device associated with one or more processors and one or more computer-readable storage media, a data store coupled with the computing device, and an entity engine that identifies an entity within a search query; references the entity store to identify one or more related entities; mines the entity store to identify a distance of each of the one or more related entities; and displays at least one of the one or more related entities.

In yet another embodiment, the present invention is directed to one or more computer storage media storing computer-useable instructions that, when used by one or more computing devices, cause the one or more computing devices to perform a method for identifying related entities. The method includes identifying an entity within a search query; referencing an entity store to identify one or more related entities related to the entity. The one or more related entities may be identified as related to the entity based on historical data of a plurality of user sessions, wherein the historical data includes a click of the one or more related entities associated with the entity within the search query. The data may then be mined to identify at least one of the one or more related entities having a predetermined distance from the entity, wherein a predetermined distance from the entity is identified in an entity graph. The one or more related entities may be ranked based on the predetermined distance from the entity and the one or more related entities and a relationship of each of the one or more related entities to the entity may be stored in the entity graph. The at least one of the one or more related entities may be displayed according to the ranking of the one or more related entities.

Having briefly described an overview of embodiments of the present invention, an exemplary operating environment in which embodiments of the present invention may be implemented is described below in order to provide a general context for various aspects of the present invention. Referring initially to FIG. 1 in particular, a block diagram illustrating an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the present invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

With reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," and the like, as all are contemplated within the scope of FIG. 1 and reference to "computing device."

The computing device 100 typically includes a variety of computer-readable media. Computer-readable media can be any available media capable of being accessed by the computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, etc. The computing device 100 includes one or more processors that read data from various entities such as the memory 112 or the I/O component(s) 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O component(s) 120, some of which may be built in. Illustrative components include a microphone, joystick, game pad, satellite dish, scanner, printer, wireless device, and the like.

Figure 2:
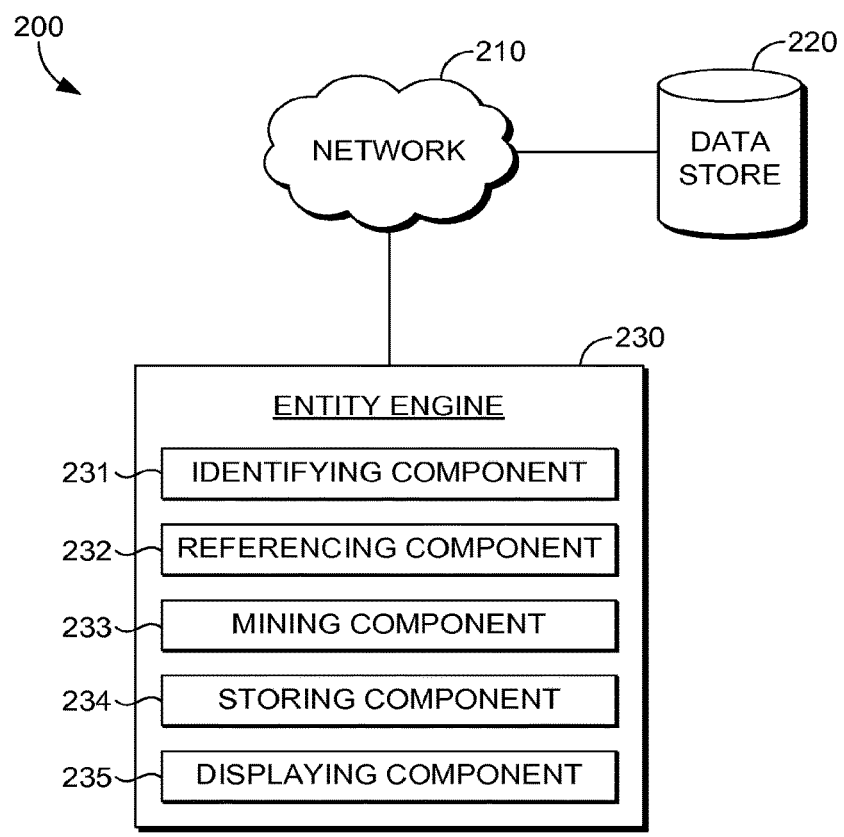
FIG. 2 is a block diagram of an exemplary computing system in which embodiments of the invention may be employed.

As indicated previously, embodiments of the present invention are directed to identifying related entities. Turning now to FIG. 2, a block diagram is provided illustrating an exemplary computing system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the computing system 200 generally includes a remote computer (not shown), a network 210, a data store 220, and an entity engine 230. The remote computing device may include any type of computing device, such as the computing device 100 described with reference to FIG. 1, for example. The entity engine 230 may take the form of a dedicated device for performing the functions described below, may be integrated into, e.g., the remote computing device, a network access device, or the like, or any combination thereof. The components of the computing system 200 may communicate with each other via the network 210, which may include, without limitation, one or more local area networks (LANs) and/or wide area networks (WANs). Such networking environments are commonplace in offices, enterprise-wide computer networks, intranets and the Internet. It should be understood that any number of personal devices and entity engines may be employed in the computing system 200 within the scope of embodiments of the present invention. Each may comprise a single device/interface or multiple devices/interfaces cooperating in a distributed environment. For instance, the entity engine 230 may comprise multiple devices and/or modules arranged in a distributed environment that collectively provide the functionality of the entity engine 230 described herein. Additionally, other components/modules not shown may also be included within the computing system 200.

In some embodiments, one or more of the illustrated components/modules may be implemented as stand-alone applications. In other embodiments, one or more of the illustrated components/modules may be implemented via the entity engine 230, as an Internet-based service, or as a module inside a search engine. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of servers or client computing devices. By way of example only, the entity engine 230 might reside on a server, cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

Generally, the computing system 200 illustrates an environment in which related entities are identified. As will be described in further detail below, embodiments of the present invention provide for identifying related entities and displaying the related entities, along with their relationship(s) to the entity, each other, or the like, in the SERP. Additional embodiments provide for displaying one or more related entities according to a ranking of the related entities.

The data store 220 is configured to store any information of an entity. For instance, the data store 220 may include various entity files, each associated with a different entity. The entity files may include an entity's name (e.g., a phrase identified in a search query) and any information associated therewith such as, for instance, a location associated with the entity, a URL address associated with the entity, and the like. As new information is identified, new entity files may be created or the existing entity file may be updated to include the new information. Detailed information with respect to building the data store 220 is provided below.

The entity engine 230 is configured to identify related entities and build the data store 220 including entity information, related entities, and all information related thereto. An entity, as used herein, refers generally to anything in a search query that may be related to any other information. Entities may be linked to a physical world (e.g., an entity may be a person, a place, a product, a company, a location, a combination thereof, or the like) or may be linked to a non-physical world (e.g., a time period, a virtual object such as a game, or the like). For example, a user may input a search query for "XYZ Company." The XYZ Company is a company that may be identified within the search query. The company may be associated with vast amounts of information including, but not limited to, a location of the company, persons associated with the company, products manufactured by the company, and the like. Additionally, a user may input a search query for a virtual entity (e.g., an entity that is not linked to the physical world such as an online game) and be presented with any information related to the virtual entity such as a developer's name, a current version, a release data, or the like.

The entity engine 230 includes an identifying component 231, a referencing component 232, a mining component 233, a storing component 234, and a displaying component 235. Each of the components is configured to identify related entities. Additionally, although not depicted in FIG. 2, the entity engine 230 is further configured to rank related entities in order to identify strong relationships from weak relationships, as will be discussed in further detail below.

The identifying component 231 is configured to identify an entity in a search query. As previously described, a search query may include one or more entities input by a user. The entity identified in the search query may be one or more of many things including, but not limited to, a person, a place, a company, a product, an event, a movie, a restaurant, or the like.

In additional embodiments, the identifying component 231 is configured to identify whether the data store 220 includes any existing information for the entity. For instance, the entity may have been previously identified and, as such, the data store 220 may include a file, a spreadsheet, or the like, pertaining to the entity. The data store 220 may include an entity graph, an example of which is depicted in FIG. 3 as entity graph 300, and will be described in detail below.

When the data store 220 is determined to include an entity graph for the entity, the referencing component 232 is configured to reference the data store to receive the entity graph for the entity. Alternatively, if the data store 220 does not include an entity graph for the entity, the referencing component 220 may receive any information from the data store 220 related to the entity. Such information may include historical information such as previous search results for the entity, click information for the entity, and the like.

The data store 220 may include an existing graph or enough related information in order to execute the present invention in real-time without requiring a new entity graph to be compiled. Alternatively, the present invention is also capable of compiling a new entity graph upon receiving a search query from a user.

Figure 3:
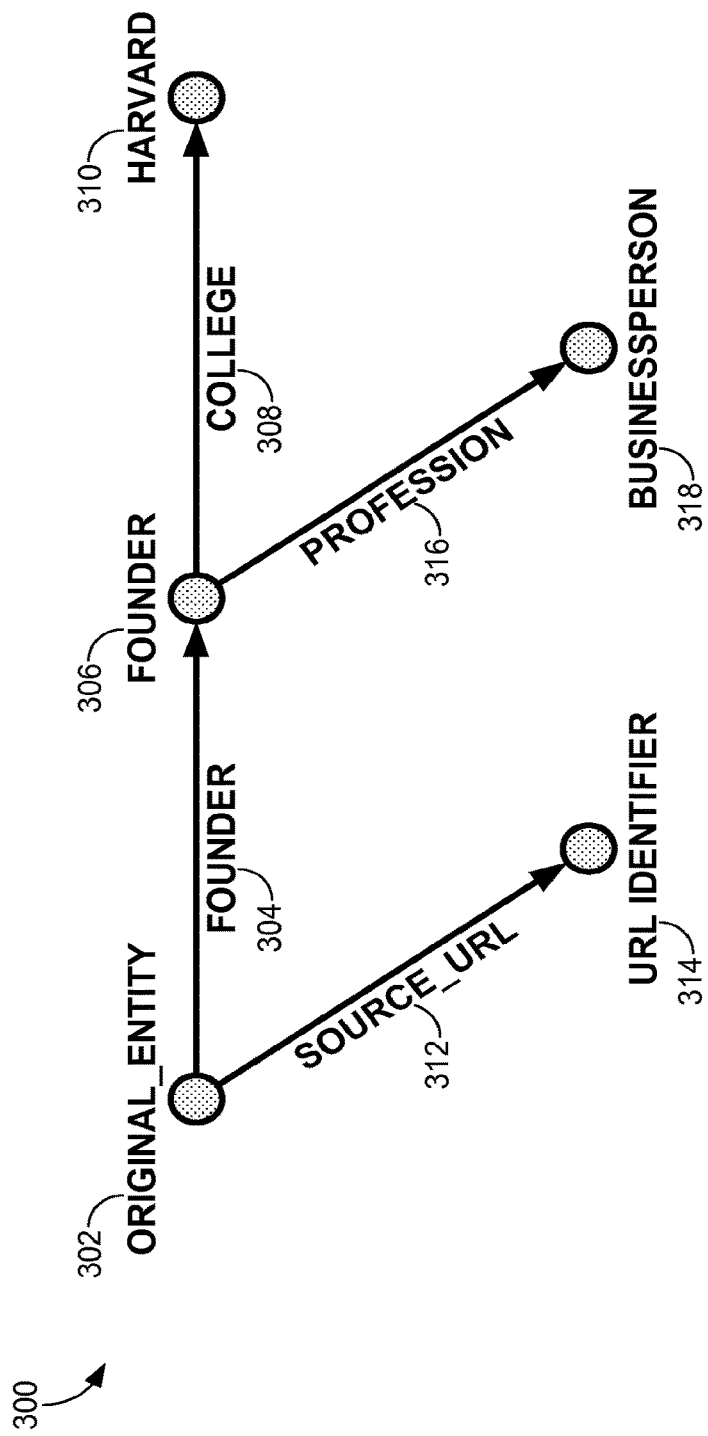
FIG. 3 is a block diagram of an exemplary entity graph, in accordance with an embodiment of the present invention.

An exemplary entity graph 300 is illustrated in FIG. 3. As illustrated in FIG. 3, an original entity 302 (e.g., the entity input into the search query) is identified and is the core of the entity graph 300. Various information may be included in the entity graph 300 (as previously described). In the instant entity graph 300, a founder 306 is identified for the original entity 302 and is linked to the original entity 302 via a founder link 304. For instance, the original entity 302 may be a company name and the founder of the company may be identified as a related entity that the user may find interesting. Similarly, a URL 314 for the original entity 302 (e.g., the company's website) may be identified and linked to the original entity 302 via a URL link 312.

The entity graph 300 continues to expand on the related information found. For instance, rather than simply identifying the founder 306, the entity graph 300 also includes the founder's 306 profession 318 via a profession link 316 and the college 310 the founder attended via a college link 308. One of ordinary skill in the art will appreciate that entity graphs may be arranged in any order desired by a user and may be expanded to a desired size such that additional information may always be easily added.

Once the data store 220 is referenced for any related information, the mining component 233 is configured to mine the received data for various information including, but not limited to, a distance of each related entity from the entity. Users may designate any criteria relevant to mine the data. For instance, data may be mined based on historical user information such as a number of clicks of the relevant entity.

The mining component 233, in embodiments, is configured to mine three specific groups of data in order to determine relatedness. The three criteria are distance of entities from one another, URL's that are co-visited by users in a specific time period, and URL's that are co-linked by pages in the entity graph.

A distance of each related entity from the entity, as used herein, refers generally to a number of connections away from an entity in an entity graph. The number of connections, or distance, may aid in distinguishing information that a user will find interesting from information that a user will not find interesting. As an example of distance in an entity graph, FIG. 3 illustrates that the founder 306 is one connection away from the original entity 302 (i.e., one link; founder link 304) while the profession 318 of the founder 306 is two connections away from the original entity 302 (i.e., two links; founder link 304 and profession link 316).

The mining component 233 may also mine data related to URL's that are co-visited by users in a specific time period. As previously indicated, historical session data of a plurality of users may be utilized to identify related entities. In embodiments, historical session data is defined as a set of URL's clicked by a user within a given time period. The mining component 233 may be configured to identify pairs of URL's that are co-visited within a user session. For instance, a user session may indicate that when search query A is input URL B and URL C are both visited. As a result, both URL B and URL C may be identified as related entities to the input search query.

Additionally, the mining component 233 may also be configured to mine data related to URL's that are co-linked by pages in the entity graph. URL's that are co-linked refers generally to patterns that tend to co-occur together in user sessions. For example, two actors starring in the same movie may be co-linked or a product and its manufacturing company may be co-linked. As a specific example, assume that products X and Y are manufactured by Manufacturer G, which is not very well-known. Products X and Y may not be seen together very often in a SERP but the mining component 233, using co-linked URL patterns, may still be able to pair Products X and Y together since they are both manufactured by Manufacturer G. These patterns may be used to derive new related entity pairs. The relatedness may be stored in, for example, the entity store 220.

Once at least one of the three above-described criteria is mined by, for example, the mining component 233, a ranking component (not shown) may rank the related entities based on the identified criteria. For instance, going back to the example used above, the founder 306 may be ranked higher than the founder's profession 318 because the founder 306 has a fewer number of connections away from the original entity 302 than the founder's profession 318 (i.e., the founder 306 was only one connection away from the original entity 302 while the founder's profession 318 was two connections away from the original entity 302). In other words, related entities having a fewer number of connections away from an original entity are said to have a stronger relationship with the original entity than other entities having a higher number of connections away from the original entity.

By ranking the one or more related entities (e.g., founders, colleges, etc.) the one or more related entities may be displayed to a user in a fashion that presents the most relevant information first such that a user is more likely to see what is desired and not be required to weed through irrelevant information. In addition to displaying the one or more related entities to the user according to their rankings, a relationship of each of the one or more related entities to the entity identified in the search query is also displayed. Thus, a user is able to identify how the related entity is related to the entity within the search query.

Either before or after ranking the one or more related entities, the data is stored in the data store 220 by, for example, the storing component 234. The storing component 234 may be configured to update any entity graphs as necessary prior to storing the entity graphs in the data store 220. The storing component 234 may also be configured to store any ranking information, either in the entity graph or separately, in the data store 220. In embodiments, the data may be stored in any desired manner.

Figure 4:
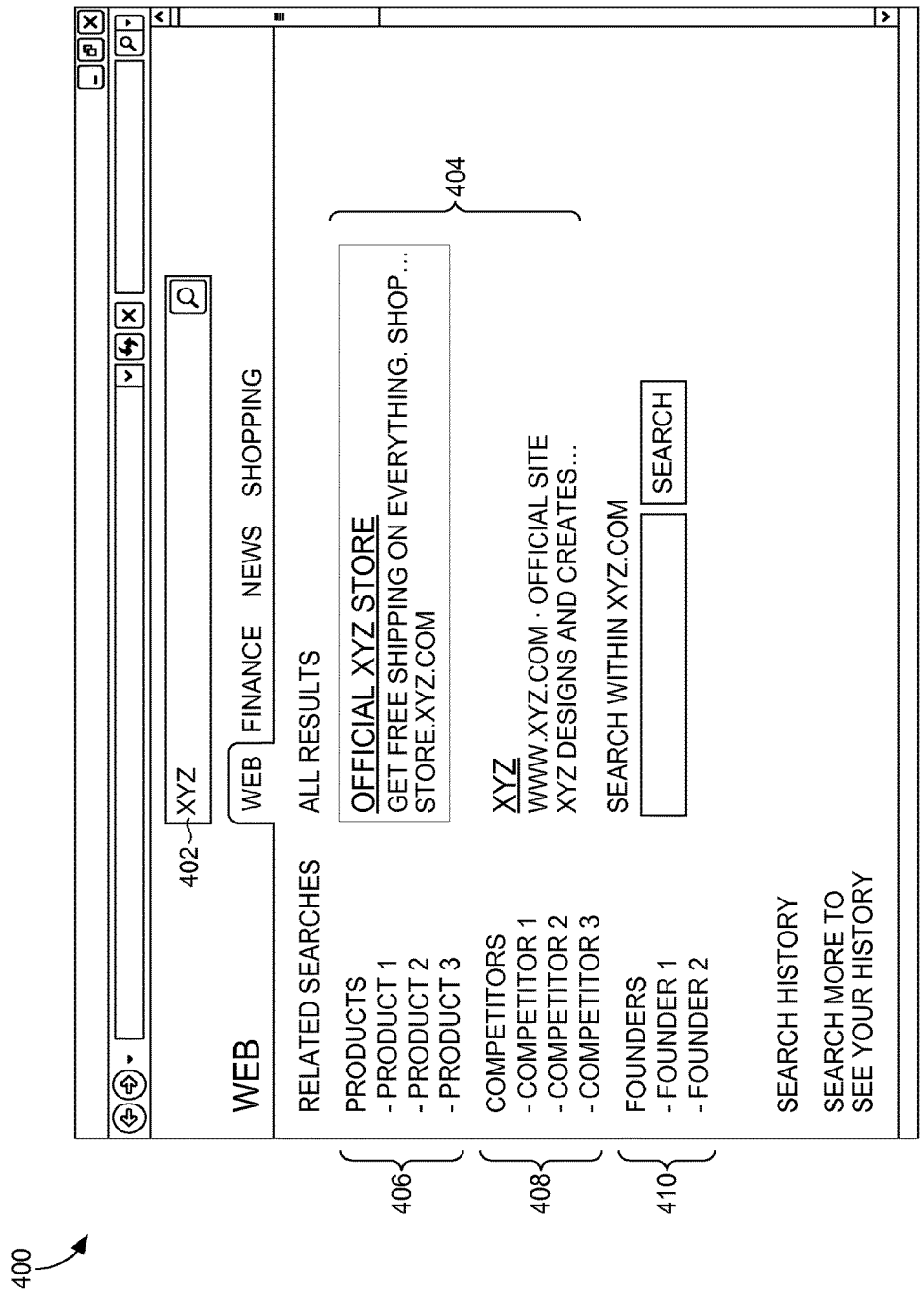
FIG. 4 is an exemplary graphical user interface illustrating an exemplary display of one or more related entities, in accordance with an embodiment of the present invention.

The entity engine 230 further includes a displaying component 235 that is configured to display the one or more related entities to the user. The one or more related entities may be displayed according to a ranking based on, for example, a predetermined distance or historical user information. FIG. 4 provides an exemplary user interface 400 that may be presented to a user. The user interface 400 includes a search query 402 that has been input by a user. The user interface includes search results 404 that are identified as related to the search query 402. Additionally, the user interface also includes related entities 406, 408, and 410. In this example, the related entities 406, 408, and 410 have been identified as products related to the search query 402 (e.g., a product of a company in a search query), a competitor (e.g., a competitor of a company in a search query), and founders (e.g., founders of a company in a search query). This information, while being presented simultaneously with the search results 404, allows a user to see related information in a condensed display and does not require the user to sort through each web page, or search result, that would be required in the related entities were simply displayed in the search result 404 along with a URL.

The organization of the related entities 406, 408, and 410 may be in any manner desired by an administrator. The related entities 406, 408, and 410 may be organized according to, for example, a ranking of the related entities 406, 408, and 410 based on a distance, a ranking of the related entities 406, 408, and 410 based on historical user data, or the like. Rankings based on historical user data may be compiled by evaluating, for example, what related entities were previously clicked on, or selected, by a user in combination with an entered search query, what URL's are co-visited by a user in a specific time frame, what URL's are co-linked by pages in the entity graph, or the like.

Figure 5:
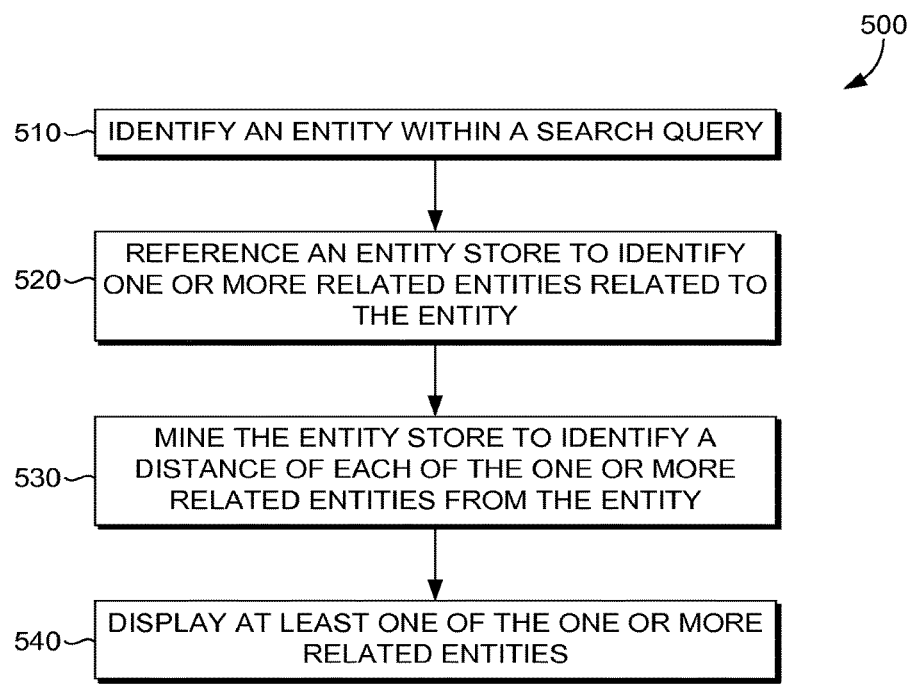
FIG. 5 is a flow diagram showing a first exemplary method 500 for identifying related entities, in accordance with an embodiment of the present invention.

Turning now to FIG. 5, a flow diagram is provided that illustrates a first exemplary method 500 for identifying related entities, in accordance with an embodiment of the present invention. Initially, at block 510, an entity is identified within a search query. At block 520, an entity store is referenced to identify one or more related entities related to the entity identified in the search query. The one or more related entities may be identified as related in an entity graph. Alternatively, any indicator may be used to organize a data store to identify the one or more related entities. The data is mined at block 530 to identify a distance associated with each of the one or more related entities. A distance is a number of connections away from the entity within an entity graph. At block 540, at least of the one or more related entities is displayed to a user. In embodiments, the displayed related entity may have a predetermined distance from the original entity.

Figure 6:
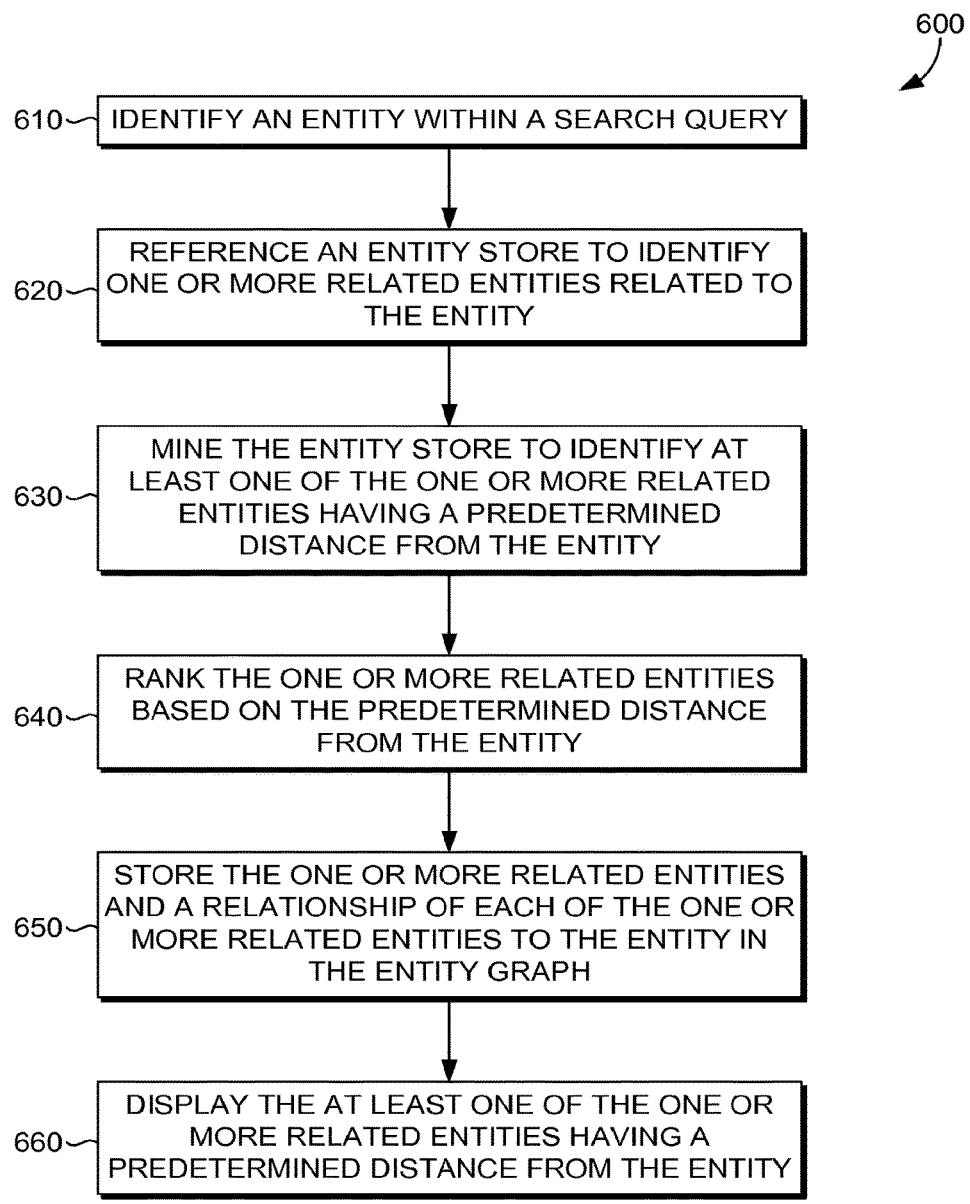
FIG. 6 is a flow diagram showing a second exemplary method 600 for identifying related entities, in accordance with an embodiment of the present invention.

With reference to FIG. 6, a flow diagram is provided that illustrates a second exemplary method 600 for identifying related entities, in accordance with an embodiment of the present invention. Initially, at block 610, an entity is identified within a search query. At block 620, an entity store is referenced to identify one or more related entities. The one or more related entities may be identified as related to the entity based on historical data of a plurality of user sessions, where the historical data may include a click of the one or more related entities associated with the entity within the search query. At block 630, the data is mined to identify at least one of the one or more related entities having a predetermined distance from the entity. For instance, a system may be configured to only identify related entities being fewer than five connections away from the entity. The predetermined distance may be identified in an entity graph.

At block 640, the one or more related entities are ranked based on the predetermined distance from the entity. At block 650, the one or more related entities and a relationship of each of the one or more related entities to the entity is stored in the entity graph. At block 660, the at least one of the one or more related entities having a predetermined distance away from the entity is displayed.

The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the method 500 of FIG. 5 and method 600 of FIG. 6 are not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. A computer-implemented method, the method comprising:
    identifying an entity within a search query;
    identifying mined criteria comprising one or more related entities related to the entity, wherein the one or more related entities are identified based on a distance of each of the one or more related entities from the entity, wherein the distance is a number of connections away from the entity for each of the one or more related entities,
    wherein the mined criteria further comprises at least one of (a) historical session data of a plurality of users and (b) at least two URLs that occur together in a user session, wherein the historical session data includes a set of URLs clicked by a user within a given time period;
    ranking the one or more related entities based on the distance of each of the one or more related entities from the entity, wherein a first related entity having a fewer number of connections from the entity than a second related entity is ranked higher than the second related entity; and
    providing at least one of the one or more related entities in a condensed display simultaneously with one or more search results responsive to the search query such that review of each of the one or more search results is avoided.

2. The method of claim 1, wherein the entity within the search query is one or more of a person, a company, or a location.

3. The method of claim 1, further comprising storing the one or more related entities and a relationship of each of the one or more related entities to the entity within the entity store.

4. The method of claim 1, wherein the distance from the entity is identified from an entity graph stored in the entity store.

5. One or more computer storage devices storing computer-useable instructions that, when used by one or more computing devices, cause the one or more computing devices to perform a method, the method comprising:
   identifying an entity within a search query;
   identifying mined criteria comprising one or more related entities related to the entity, wherein the one or more related entities are identified based on a distance of each of the one or more related entities from the entity, wherein the distance is a number of connections away from the entity for each of the one or more related entities,
   wherein the mined criteria further comprises at least one of (a) historical session data of a plurality of users and (b) at least two URLs that occur together in a user session, wherein the historical session data includes a set of URLs clicked by a user within a given time period;
   ranking the one or more related entities based on the distance of each of the one or more related entities from the entity, wherein a first related entity having a fewer number of connections from the entity than a second related entity is ranked higher than the second related entity; and
   providing at least one of the one or more related entities in a condensed display simultaneously with one or more search results responsive to the search query, wherein the condensed display provides the one or more related entities separate from the one or more search results such that review of each of the one or more search results is avoided.

6. The one or more computer storage devices of claim 5, wherein the entity within the search query is one or more of a person, a company, or a location.

7. The one or more computer storage devices of claim 5, wherein the method further comprises storing the one or more related entities and a relationship of each of the one or more related entities to the entity within the entity store.

8. A system for identifying related entities, the system comprising:
   a computing device associated with one or more processors and one or more computer-readable storage devices;
   an entity store coupled with the computing device; and
   an entity engine that:
      identifies an entity within a search query;
      identifies mined criteria comprising one or more related entities related to the entity, wherein the one or more related entities are identified based on a distance of each of the one or more related entities from the entity, wherein the distance is a number of connections away from the entity for each of the one or more related entities,
      wherein the mined criteria further comprises at least one of (a) historical session data of a plurality of users and (b) at least two URLs that occur together in a user session, wherein the historical session data includes a set of URLs clicked by a user within a given time period;
      ranks the one or more related entities based on the distance of each of the one or more related entities from the entity, wherein a first related entity having a fewer number of connections from the entity than a second related entity is ranked higher than the second related entity; and
      provides at least one of the one or more related entities in a condensed display simultaneously with one or more search results responsive to the search query, wherein the condensed display provides the one or more related entities separate from the one or more search results such that review of each of the one or more search results is avoided.

9. The system of claim 8, wherein the mined criteria is mined from an entity graph within the entity store.

* * * * *